(12) United States Patent
Tanaka et al.

(10) Patent No.: US 8,827,057 B2
(45) Date of Patent: Sep. 9, 2014

(54) SHOCK ABSORBING STRUCTURE

(75) Inventors: Atsumi Tanaka, Aichi (JP); Naoki Higuchi, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 158 days.

(21) Appl. No.: 13/384,003

(22) PCT Filed: Jul. 15, 2010

(86) PCT No.: PCT/JP2010/062013
§ 371 (c)(1),
(2), (4) Date: Jan. 19, 2012

(87) PCT Pub. No.: WO2011/007846
PCT Pub. Date: Jan. 20, 2011

(65) Prior Publication Data
US 2012/0112004 A1 May 10, 2012

(30) Foreign Application Priority Data

Jul. 17, 2009 (JP) ................................ 2009-169301

(51) Int. Cl.
*F16F 7/12* (2006.01)
*B64C 1/06* (2006.01)
*B60R 19/18* (2006.01)
*B64C 27/04* (2006.01)

(52) U.S. Cl.
CPC .............. *B64C 1/062* (2013.01); *B60R 19/18* (2013.01); *B64C 27/04* (2013.01)
USPC ........ 188/377; 188/129; 188/210; 188/282.9; 188/371; 244/117 R; 244/119; 244/123.4

(58) Field of Classification Search
USPC .................. 188/377, 371–376; 244/119–120, 244/122 AG, 123.4, 108
See application file for complete search history.

(56) References Cited

U.S. PATENT DOCUMENTS 3,088,561 A * 5/1963 Ruzicka .......................... 52/841
4,593,870 A * 6/1986 Cronkhite et al. ......... 244/117 R
(Continued)

FOREIGN PATENT DOCUMENTS

| JP | 2677676 | 11/1997 | | |
|----|---------|---------|----|----|
| JP | 2001354197 A | * 12/2001 | ............... | B64C 1/06 |
| JP | 3888630 | 3/2007 | | |
| JP | 2009-113596 | 5/2009 | | |
| JP | 2009-154587 | 7/2009 | | |

OTHER PUBLICATIONS

Japanese Office Action issued Oct. 4, 2012 in corresponding Japanese Patent Application No. 2009-169301 with partial English translation.
International Search Report issued Aug. 24, 2010 in International (PCT) Application No. PCT/JP2010/062013.

*Primary Examiner* — Anna Momper
*Assistant Examiner* — San Aung
(74) *Attorney, Agent, or Firm* — Wenderoth, Lind & Ponack, L.L.P.

(57) ABSTRACT

It is desired to make a shock absorbing structure small in size. The shock absorbing structure includes a beam-like structural member having a concave section; and a shock absorbing member, one end of which is arranged in the concave section to abut to the structural member and the other end of which is arranged outside the structural member. Even in a case of a dead stroke when the shock absorbing member is bottomed out, the concave section overlaps with the structural member supporting the structure, so that there is no wasteful space.

18 Claims, 10 Drawing Sheets

(56) References Cited

U.S. PATENT DOCUMENTS

| | | | |
|---|---|---|---|
| 5,024,399 A | 6/1991 | Barquet et al. | |
| 5,308,675 A * | 5/1994 | Crane et al. | 428/120 |
| 6,959,894 B2 | 11/2005 | Hayashi | |
| 7,204,515 B2 * | 4/2007 | Penner et al. | 280/752 |
| 2007/0194175 A1 * | 8/2007 | Kismarton et al. | 244/120 |

* cited by examiner

SHOCK ABSORBING STRUCTURE

TECHNICAL FIELD

The present invention is related to an installation structure of a shock absorbing member.

RELATED ART

A shock absorbing member is known which uses a member exemplified by carbon fiber reinforced plastics. For example, the shock absorbing member of an angular tube shape absorbs an impact while crushing into an axis line direction when the impact is imposed into the axis line direction. As a result, the impact applied to a main body to which the shock absorbing member is attached is reduced.

As a structure of a navigation body such as an automobile and an aircraft (for example, a helicopter which is a rotary-wing aircraft), a shock absorbing structure is used for shock absorption in case of collision. For example, in the helicopter as the rotary-wing aircraft, an underfloor structure provided with the shock absorbing structure is proposed in order to secure safety of crews at the time of crash landing.

When the shock absorbing member crushes for a length or more, the fragments of a destructed part of the shock absorbing member fill the inside of the shock absorbing member which limits further crushing of the shock absorbing member, and thus the shock absorbing member is bottomed out and loses shock absorbing ability. FIG. 1 shows an example of a relation between a displacement (crushing length) of the shock absorbing member and load. When the displacement exceeds a point B, the impact load begins to increase rapidly and the shock absorbing ability is lost.

FIG. 2A show a reference example of the installation structure of the shock absorbing member. FIG. 2A shows an example that the shock absorbing member is installed in a lower portion of the rotary-wing aircraft. A fuselage of the rotary-wing aircraft is formed from a structural beam 102. The structural beam 102 supports a floor board 101. A shock absorbing member 103 is attached to the structural beam 102. It is shown that the thickness of the structural beam 102 is L11, the length of the shock absorbing member 103 is L12, and the length from the floor board 101 to the shock absorbing member 103 is L13.

FIG. 2B shows a state that an impact is imposed to an axis line direction of the shock absorbing member shown in FIG. 2A so that the shock absorbing member is bottomed out. The length of the shock absorbing member 103a when a part 104 crushes so that the shock absorbing member 103 is bottomed out is shown as L14. A relation of the bottoming displacement B in FIG. 1 is L12–L14=B. The length L14 of the shock absorbing member in the bottoming state is a dead stroke.

As a reference example of a technique which deals with the bottoming, Patent Literature 1 is exemplified. A shock enduring structure of a helicopter is described in Patent Literature 1. In this technique, a foaming agent is injected only to a partial space of one of a space between fiber-reinforced composite material hollow tubes and an internal space of each fiber-reinforced composite material hollow tube. Thus, a destruction fragment is set in the foaming agent, or the destruction fragment is housed in a sectional space, so that attainment of rigidity of the whole member due to compaction of the destruction fragment is prevented. An effective stroke is utilized.

CITATION LIST

[Patent Literature 1]: Japanese Patent No. 3888630

SUMMARY OF THE INVENTION

A part of the shock absorbing member shown in FIG. 2B corresponding to the length L14 is the dead stroke and there is not an ability to absorb the impact. Therefore, in order to secure enough shock absorbing ability, it is required to use the shock absorbing member of the length L12 which is obtained by adding the effective stroke to the length L14 at the time of bottoming out. Moreover, because the thickness L11 of the structural beam 102 is added, the length L13 from the floor board 101 to the end of the shock absorbing member 103 is considerably long. It is difficult to make a compact structure which includes the shock absorbing member due to the length L13.

FIG. 3 shows an example in which the shock absorbing member 103 is fixed on the floor board 101 at a portion other than the structural beam 102. In this case, the length from the floor board 101 to the end of the shock absorbing member 103 is the length L12, and the structure can be made short by thickness L11 of the structural beam 102, compared with a case of FIG. 2A. However, in such a structure, the floor board 101 must be reinforced so as not for the floor board 101 to be destroyed with the reaction when an impact is imposed to the shock absorbing member 103. Therefore, the weight increases.

It is desired to make the shock absorbing structure small in size and light in weight so as to make the structures such as an automobile and an aircraft small in size and light in weight.

In one aspect of the present invention, the shock absorbing structure includes a beam-like structural member (6) having a concave section; and a shock absorbing member (12), one end of which is arranged in said concave section to abut to the structural member and the other end of which is arranged outside the structural member.

According to such a shock absorbing structure, even when the shock absorbing member is bottomed out while a dead stroke is remained, the region of the concave section overlaps with a region of the structural beam, so that there is no wasteful space.

In another aspect of the present invention, the beam-like structural member is provided with a first flange; a first web, one end of which is fixed on one surface of the first flange; and a second flange which is fixed on the other end of said first web to be in parallel to the first flange. The concave section is formed form the first web and the one surface of the first flange.

In further another aspect of the present invention, the beam-like structural member is further provided with: a second web, one end of which is fixed on the one surface of the first flange to be in parallel to the first web; and a third flange which is fixed on the other end of the second web to be in parallel to the first flange and which forms a space between the second flange and the third flange. The concave section is formed by the first web, the second web and the one surface of the first flange.

In another aspect of the present invention, a through-hole is provided in a portion of the first flange to which the shock absorbing member abuts.

In another aspect of the present invention, a rotary-wing aircraft is provided with: a floor supported by the first flange; and a bottom plane supported by the beam-like structural member and arranged on a lower-side of the floor. A longitudinal direction of said shock absorbing member is a vertical direction.

In another aspect of the present invention, in an automobile, the shock absorbing member is arranged such that the other end of the shock absorbing member turns to a front direction of the automobile.

With the present invention, the shock absorbing structure can be made small.

BRIEF DESCRIPTION OF THE DRAWINGS

The above object, other object, effects and features of the present invention would be made clear from the following description made in conjunction with the attached drawings.

DESCRIPTION OF EMBODIMENTS

Figure 4:
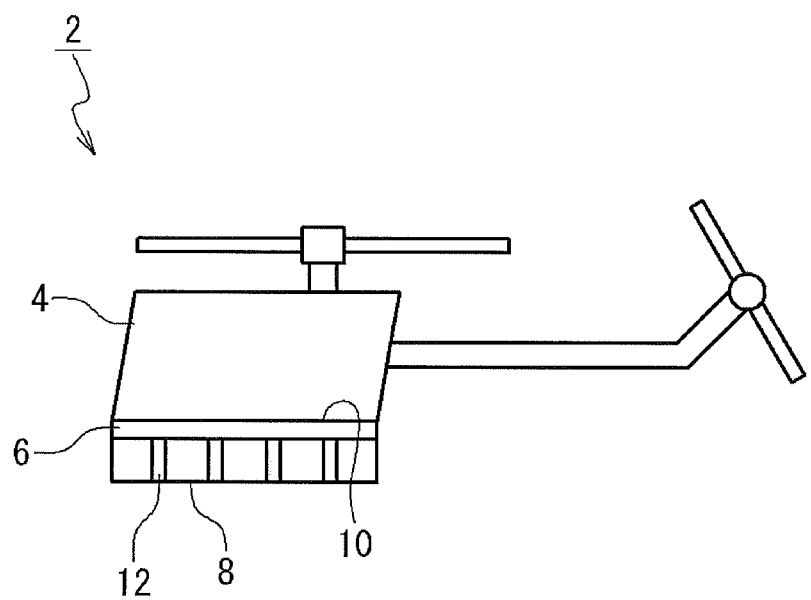
FIG. 4 is a side view showing a rotary-wing aircraft provided with a shock absorbing structure.

Hereinafter, embodiments of the present invention will be described with reference to the attached drawings. FIG. 4 is a sectional view showing a rotary-wing aircraft (especially, a helicopter) provided with a shock absorbing structure according to an embodiment of the present invention when viewed from the side. A rotary-wing aircraft 2 is provided with a fuselage 4. The fuselage 4 is provided with a floor 10. The floor 10 supports seats, cargo and so on. A shock absorbing structure is arranged under the floor 10. The shock absorbing structure is provided with structural beams 6 and shock absorbing members 12. A bottom plate 8 which is an outer plate of the fuselage 2 on the lower side is supported by the structural beams 6 and arranged in the lower ends of the shock absorbing members 12. In such a rotary-wing aircraft, when the bottom collides with the ground and an obstacle, the shock absorbing member 12 absorbs an impact while crushing, so as to protect the structure of the fuselage 4 and aircrews inside it.

Figure 5:
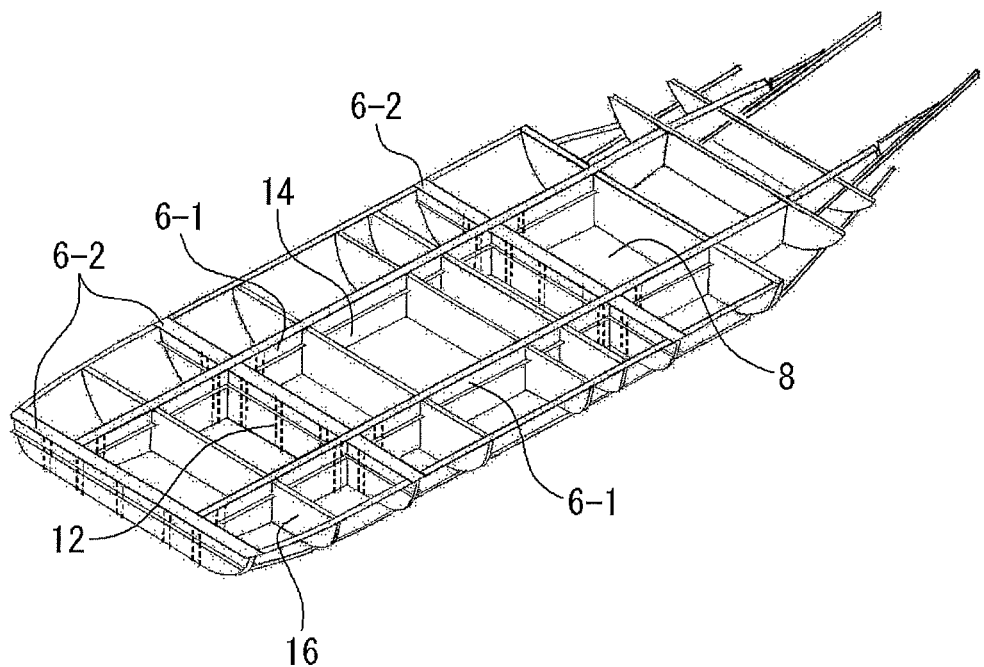
FIG. 5 is a diagram showing an underfloor structure of the rotary-wing aircraft.

FIG. 5 shows a structure under the floor 10 of the rotary-wing aircraft 2. The structural beams 6-1 and 6-2 are arranged under the floor. The plurality of structural beams 6-1 are arranged in parallel to the longitudinal direction of the rotary-wing aircraft 2. The plurality of structural beams 6-2 are arranged in parallel to the lateral direction of the rotary-wing aircraft 2. The structural beams 6-1 and 6-2 are reinforcement members in the longitudinal and lateral directions to the load during the operation of the rotary-wing aircraft 2.

Under the floor of the rotary-wing aircraft 2, webs 14 supported by the structural beams 6-1 and extending along the structural beam 6-1, and frames 16 supported by the structural beams 6-2 and extending along the structural beams 6-2 are arranged. A bottom plate 8 is attached to cover the lower ends of the webs 14 and the frames 16.

Figure 6:
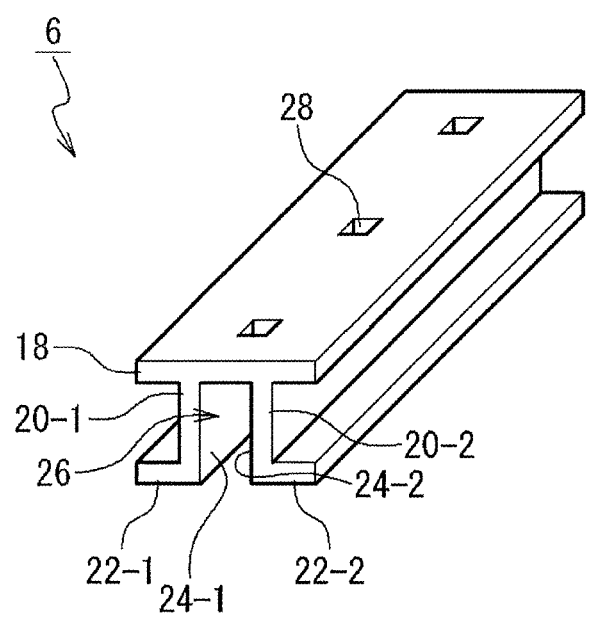
FIG. 6 is a perspective view showing a structural beam.

FIG. 6 is a perspective view showing the structural beam 6. The structural beam 6 is equivalent to each of the structural beams 6-1 and 6-2 in FIG. 5. The structural beam 6 has flanges 18, 22-1, and 22-2 and webs 20-1 and 20-2. These are members, each of which is a member having a thin, long and tabular shape and has two principal surfaces of a principal surface (upper-side surface) and a principal surface (lower-side surface). The flange 18 and the flanges 22-1 and 22-2 correspond to the flange on the upper-side and the flange on the lower-side in the I-type structural beam. The webs 20-1 and 20-2 are connected with the flange 18 on the lower-side surface of the flange 18 and correspond to the web in the I-type structural beam. The structure of the structural beam 6 is different from the I-type structural beam and has the structure shown below when viewing a sectional plane perpendicular to the longitudinal direction. The webs 20-1 and 20-2 having substantially the same shape are attached to the identical principal surface (lower-side surface) of the flange 18 so as for the principal planes of the two webs to be in parallel to each other. The longitudinal direction of the webs 20-1 and 20-2 and the longitudinal direction of the flange 18 are the same. The principal surfaces of the webs 20-1 and 20-2 and the principal surface of the flange 18 are perpendicular. A space 26 exists between the two webs 20-1 and 20-2 to have a predetermined width and to extend into the longitudinal direction of the structural beam 6 while having a constant shape. The lower end of the first web 20-1 is connected with the one end of the first flange 22-1. The first flange 22-1 extends into a direction opposite to the space 26 from the one end. The lower end of the second web 20-1 is connected with the one end of the second flange 22-2. The second flange 22-2 extends into a direction opposite to the space 26 from the one end. The longitudinal directions of the first flange 22-1, the second flange 22-2 and the flange 18 are the same and moreover their principal surfaces are parallel to each other. The structural beam 6 is a π type beam having a π type section which is formed from the flange 18 as an upper side, the web 20-1 and the flange 22-1 as a left leg, and the web 20-2 and the flange 22-2 as a right leg.

Through-holes 28 are provided for the flange 18. The through-hole 28 connects the space 26 on the underside of the flange 18 and a space on the upper side of the flange 18. A plurality of through-holes 28 are arranged along the longitudinal direction of the structural beam 6. The position where the through-hole 28 is arranged is a position where the shock absorbing member 12 is arranged. One end of the shock absorbing member 12 is inserted into a concave section which is formed from the lower-side surface of the flange 18, an inner surface 24-1 of the first web 20-1 which faces the space 26 and an inner surface 24-2 of the second web 20-2 which faces the space 26, and the shock absorbing member 12 is fixed. The installation of the shock absorbing member 12 can be made through gluing to the inner surfaces 24-1 and 24-2 of the space 26, the web 14, and the frame 16 by using adhesive.

Figure 7A:
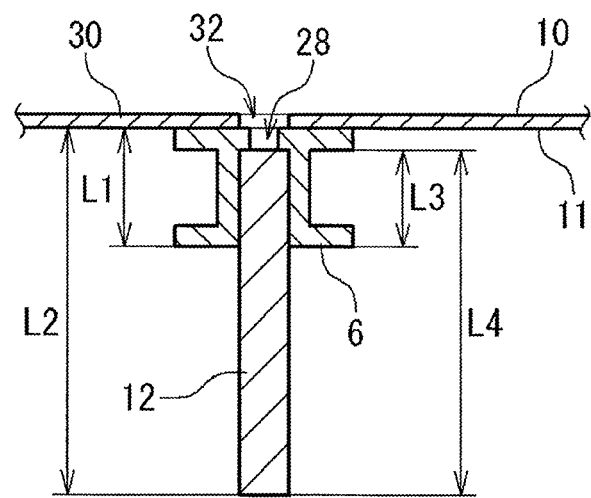
FIG. 7A is a sectional view showing the shock absorbing structure in an embodiment.

FIG. 7A is a sectional view showing the shock absorbing structure in the present embodiment. The section of the structural beam 6 which is perpendicular to the longitudinal direction is shown. The flange 18 of the structural beam 6 is attached at the upper surface to an installation surface 11 which is a lower-side surface of the floor board 30 of the rotary-wing aircraft 2.

The shock absorbing member 12 is a stick-shaped member. The longitudinal direction of the member 12 is a crush direction in which the shock absorbing member 12 is crushed and compressed, when an impact is imposed. The shock absorbing member 12 is attached at the upper end to the bottom of the concave section of the structural beam 6 when the longitudinal direction of the member 12 is an upper and lower direction (a vertical direction) of the rotary-wing aircraft 2. When the width of the shock absorbing member 12 is equal to a width when the adhesive is applied to the inner surfaces of the space 26, the installation is easy and is desirable. In this case, the upper end of the shock absorbing member 12 abuts to the lower-side surface of the flange 18 which faces the space 26 and contacts the inner surfaces 24-1 and 24-2.

The through-hole 28 is provided in a position of the flange 18 where the shock absorbing member 12 abuts to the flange 18. A through-hole 32 is provided in a portion of the floor board 30 corresponding to an area in which the through-hole 28 is provided. The upper end of the shock absorbing member 12 is exposed on the side of the floor 10 through the through-hole 28 and the through-hole 32. The area where the through-hole 28 is provided is smaller than the area where the shock absorbing member 12 abuts to the lower-side surface of the flange 18. Therefore, when an impact is imposed, the shock absorbing member 12 is destroyed from the bottom end in the state that upper end of the member 12 is supported with the flange 18 of the structural beam 6.

Figure 7B:
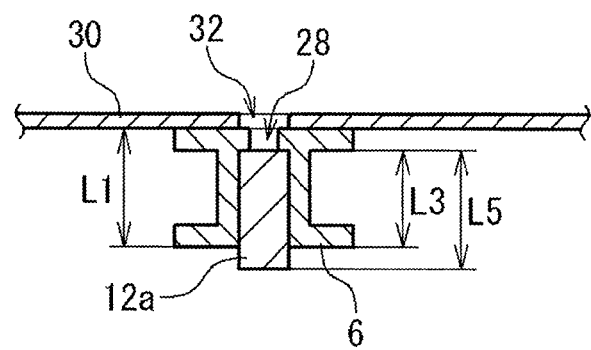
FIG. 7B shows a state that the shock absorbing structure in the embodiment is bottomed out.

FIG. 7B shows the shock absorbing member 12a which is crushed with the impact and is bottomed out. The length of a dead stroke on the bottoming of the shock absorbing member 12a is shown as L5. Of the length L5 of the shock absorbing member 12a, the length L3 from the underside surface of the flange 18 to the lower-side surfaces of the flanges 22-1 and 22-2 overlaps with the length of the structural beam 6. Therefore, the length L5–L3 of the dead stroke outside the structural beam 6 can be made short.

Figure 1:
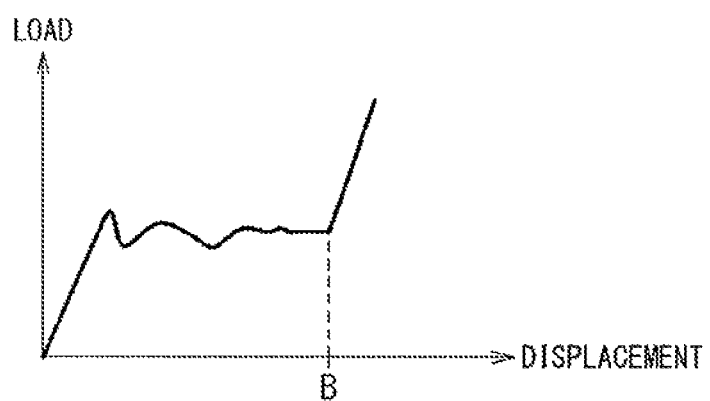
FIG. 1 shows relation between displacement and load of a shock absorbing member.
Figure 2A:
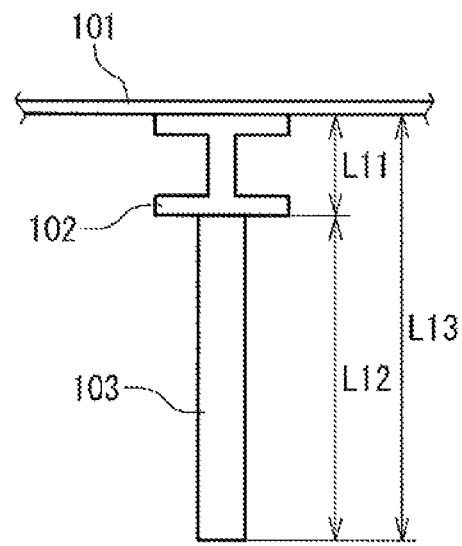
FIG. 2A show an installation structure of the shock absorbing member as a reference example.
Figure 2B:
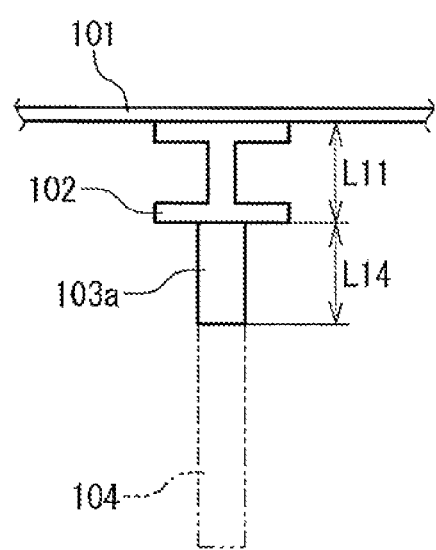
FIG. 2B shows a condition that the shock absorbing member as the reference example is bottomed out.
Figure 3:
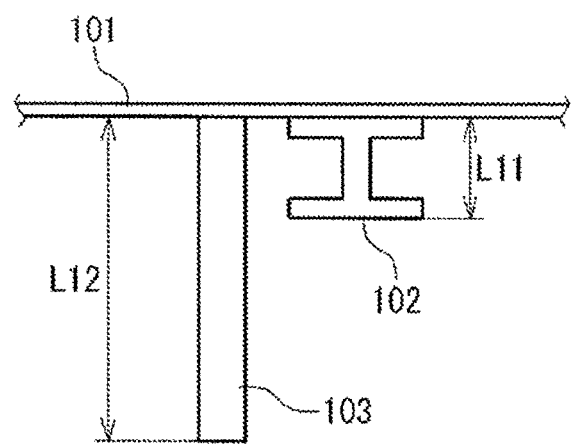
FIG. 3 shows an installation structure of the shock absorbing member as another reference example.

Comparing with the shock absorbing structure of FIG. 2A, when the shock absorbing member 103 and the shock absorbing member 12 are formed of the same material, the size which is necessary for the underside of the floor is L13=L11+L12 in the structure of FIG. 2A. On the other hand, in the example of FIG. 7A, the size which is necessary for the underside of the floor is L2=L4+(L1−L3). When the shock absorbing member and the structural beam of the same size are used, the length L2 on the underside of the floor can be shortened by the length L3 while securing the effective stroke (L4−L5), in case of FIG. 7A. Therefore, by using the structural beam 6 of the π type as shown in FIG. 7A, the equivalent shock absorption effect can be attained in the smaller underfloor structure, compared with the case of FIG. 2A. Or, in the fuselage with the same overall size, the larger space can be secured above the floor.

When the shock absorbing member 12 receives the impact and the destruction progresses, a part of the fragment passes through the through-holes 28 and 32 to the space above the floor 10. As a result, the bottoming of the shock absorbing member 12 can be delayed to reduce the dead stroke. Therefore, the length L4 of the shock absorbing member 12 which is necessary to attain an identical shock absorption effect can be made small and the size of the structure in the underfloor portion can be made smaller. In order to prevent fragments from scattering onto the floor, a scattering prevention member such as the sheet of the resin is provided on the floor 10 to cover the through-hole 32.

Figure 8:
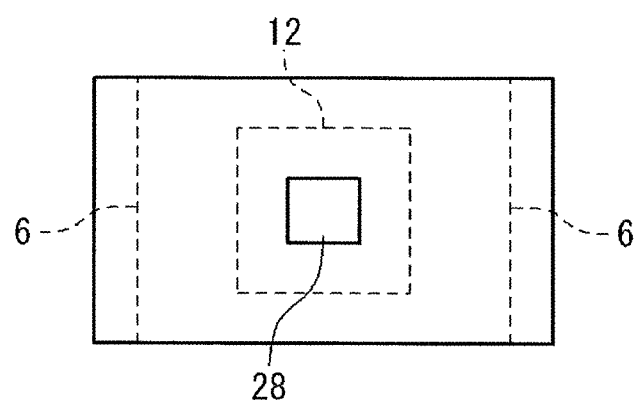
FIG. 8 is a floor top view.

FIG. 8 shows a top view showing the shock absorbing member when viewed from the floor 10. The through-hole 28 is formed in the floor board 30. The shock absorbing member 12 may have a section of any shape, and in the present embodiment, the section shape is square as shown by a dotted line in FIG. 8. In case of such a square column shape, because the inner surfaces 24-1 and 24-2 of the structural beam 6 of the .pi.-type section and the sides of the shock absorbing member 12 contact in plane, it is easy to fix the shock absorbing member 12.

The shape of the structural beam 6 may be another shape if it has a concave section to support the one end of the shock absorbing member 12. For example, the structural beam 6 may have the π-type structure only in the portion to which the shock absorbing member 12 is attached, and a general I-type structure in the other portion. However, the beam which has a uniform sectional shape as shown in FIG. 6 is excellent in a point of the manufacturing facility. The π-type beam as shown in FIG. 6 is excellent especially in the strength and the manufacturing facility.

Figure 9:
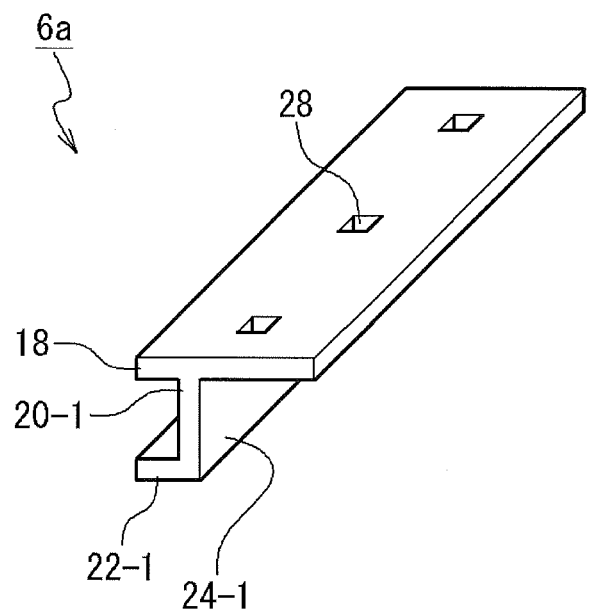
FIG. 9 is a perspective view showing another structural beam.
Figure 10:
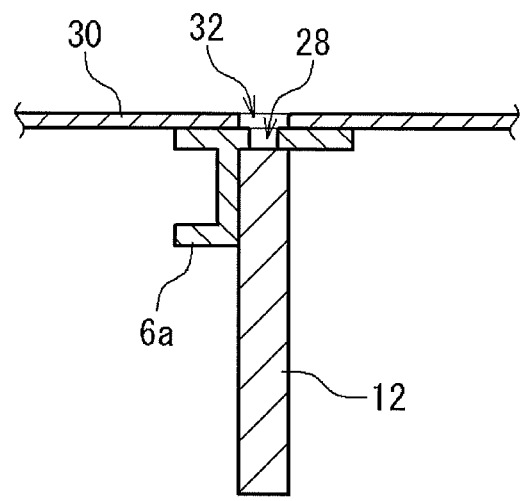
FIG. 10 is a sectional view showing the shock absorbing structure in another embodiment.

FIG. 9 shows another example of the structural beam. The structural beam 6a is a J-type beam which has the sectional shape of a J character and in which the second web 20-2 and the second flange 22-2 are removed, compared with the π-type beam shown in FIG. 6. FIG. 10 is a side view of the shock absorbing structure in which the shock absorbing member 12 is attached to the structural beam 6a. In this case, the shock absorbing member 12 is installed in the concave section which is formed from the lower-side portion of the flange 18 and the inner surface 24-1 of the web 20-1. In this example, too, the same effect as the effect described by referring to FIG. 7A, FIG. 7B can be attained.

Figure 11:
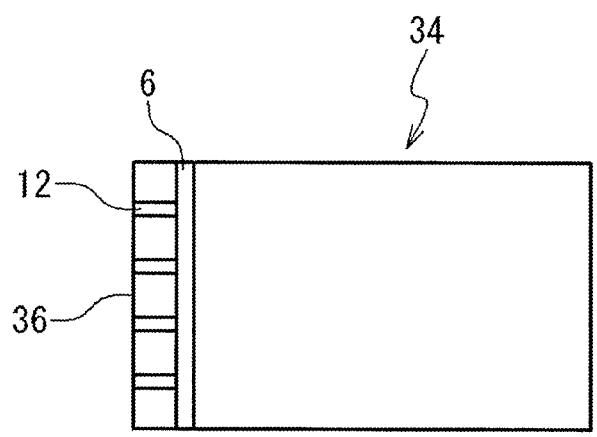
FIG. 11 is a top view of an automobile provided with the shock absorbing structure.

FIG. 11 is a top view showing an example in which the shock absorbing structure of the present embodiment is applied to an automobile car. The structural beam 6 is attached to the neighborhood of the front surface 36 of the automobile 34 while the width direction of the automobile is a longitudinal direction of the beam 6. In the example of the structural beam 6 of FIG. 6, as for the direction of the structural beam 6, the surface of the flange 18 is vertical, the surfaces of the webs 20-1 and 20-2 are horizontal, and the flange 18 is provided on a back side in a movement direction of the automobile 34 and the opening of the concave section 26 is provided on a front side in the movement direction. The shock absorbing member 12 is inserted into the concave section of the structural beam 6. The shock absorbing member 12 is fixed in the longitudinal direction which is the movement direction of the automobile 34. According to such a shock absorbing structure, the high shock absorption effect can be attained while restraining the length of automobile 34.

The present invention has been described in the above with reference to the embodiments. However, the present invention is not limited to the embodiments. It is possible to carry out various modifications to the embodiments.

The invention claimed is:
1. A shock absorbing structure comprising:
    a beam structural member having
        a first flange extending in a longitudinal direction,
        a first web extending from said first flange in a first direction perpendicular to a first surface of said first flange and extending along the longitudinal direction of said first flange, and
        a second flange extending outwardly from an end portion of said first web in a direction parallel to the first surface of said first flange and extending along the longitudinal direction of said first flange; and a shock absorbing member having one end abutting the first surface of said first flange and a first side portion adjacent to the one end and fixed to said first web,
wherein said shock absorbing member extends in the perpendicular direction to the first surface, and
wherein said second flange extends outwardly from a middle portion of said shock absorbing member in a longitudinal direction of said shock absorbing member.

2. The shock absorbing structure of claim 1, wherein a concave section is formed from said first web and the first surface of said first flange, and said shock absorbing member is fixed to the concave section.

3. The shock absorbing structure of claim 1, wherein said beam structural member further comprises:
a second web extending from said first flange in parallel to said first web in the first direction perpendicular to the first surface of said first flange and extending along the longitudinal direction of said first flange;
a third flange extending outwardly from an end portion of said second web in the direction parallel to the first surface of said first flange and opposed to said second flange and extending along the longitudinal direction of said first flange,
wherein said third flange extends outwardly from a middle portion of said shock absorbing member in a longitudinal direction of said shock absorbing member.

4. The shock absorbing structure of claim 1, wherein a through-hole is provided in a portion of said first flange to which said shock absorbing member abuts.

5. The shock absorbing structure of claim 1, wherein the one end of the shock absorbing member which abuts the first surface of the first flange is a first distal end of the shock absorbing member, and the shock absorbing member has a second distal end spaced apart from the first distal end in the first direction,
wherein the shock absorbing member extends in the first direction from the first surface of the first flange past a distal end of the beam structural member, and
wherein said first flange and said second flange of said beam structural member are closer to the first distal end of the shock absorbing member than the second distal end.

6. The shock absorbing structure of claim 1,
wherein said beam structural member further comprises:
a second web extending from said first flange in parallel to said first web in the first direction perpendicular to the first surface of said first flange and extending along the longitudinal direction of said first flange;
a third flange extending outwardly from an end portion of said second web in the direction parallel to the first surface of said first flange and opposed to said second flange and extending along the longitudinal direction of said first flange,
wherein said third flange extends outwardly from a middle portion of said shock absorbing member in a longitudinal direction of said shock absorbing member,
wherein the one end of the shock absorbing member which abuts the first surface of the first flange is a first distal end of the shock absorbing member, and the shock absorbing member has a second distal end spaced apart from the first distal end in the first direction,
wherein the shock absorbing member extends in the first direction from the first surface of the first flange past a distal end of the beam structural member, and
wherein said first flange, said second flange, and said third flange of said beam structural member are closer to the first distal end of the shock absorbing member than the second distal end.

7. A rotary-wing aircraft comprising:
a shock absorbing structure which includes:
a beam structural member having
(i) a first flange extending in a longitudinal direction,
(ii) a first web extending from said first flange in a first direction perpendicular to a first surface of said first flange and extending along the longitudinal direction of said first flange, and
(iii) a second flange extending outwardly from an end portion of said first web in a direction parallel to the first surface of said first flange and extending along the longitudinal direction of said first flange;
a shock absorbing member having one end abutting the first surface of said first flange and a first side portion adjacent to the one end and fixed to said first web, wherein said shock absorbing member extends in the perpendicular direction to the first surface, and said second flange extends outwardly from a middle portion of said shock absorbing member in a longitudinal direction of said shock absorbing member;
a floor supported by said first flange; and
a bottom plane supported by said beam-like structural member and arranged on a underside of said floor,
wherein a longitudinal direction of said shock absorbing member is a vertical direction.

8. The rotary-wing aircraft of claim 7, wherein a concave section is formed from said first web and the first surface of said first flange, and said shock absorbing member is fixed to the concave section.

9. The rotary-wing aircraft of claim 7, wherein said beam-like structural member further comprises:
a second web extending from said first flange in parallel to said first web in the first direction perpendicular to the first surface of said first flange and extending along the longitudinal direction of said first flange; and
a third flange extending outwardly from an end portion of said second web in the direction parallel to the first surface of said first flange and opposed to said second flange and extending along the longitudinal direction of said first flange,
wherein said third flange extends outwardly from a middle portion of said shock absorbing member in a longitudinal direction of said shock absorbing member.

10. The rotary-wing aircraft of claim 7, wherein a through-hole is provided in a portion of said first flange to which said shock absorbing member abuts.

11. The rotary-wing aircraft of claim 7, wherein the one end of the shock absorbing member which abuts the first surface of the first flange is a first distal end of the shock absorbing member, and the shock absorbing member has a second distal end spaced apart from the first distal end in the first direction,
wherein the shock absorbing member extends in the first direction from the first surface of the first flange past a distal end of the beam structural member, and
wherein said first flange and said second flange of said beam structural member are closer to the first distal end of the shock absorbing member than the second distal end.

12. The rotary-wing aircraft of claim 7,
wherein said beam structural member further comprises:
a second web extending from said first flange in parallel to said first web in the first direction perpendicular to the first surface of said first flange and extending along the longitudinal direction of said first flange;

a third flange extending outwardly from an end portion of said second web in the direction parallel to the first surface of said first flange and opposed to said second flange and extending along the longitudinal direction of said first flange, wherein said third flange extends outwardly from a middle portion of said shock absorbing member in a longitudinal direction of said shock absorbing member, wherein the one end of the shock absorbing member which abuts the first surface of the first flange is a first distal end of the shock absorbing member, and the shock absorbing member has a second distal end spaced apart from the first distal end in the first direction, wherein the shock absorbing member extends in the first direction from the first surface of the first flange past a distal end of the beam structural member, and wherein said first flange, said second flange, and said third flange of said beam structural member are closer to the first distal end of the shock absorbing member than the second distal end.

13. An automobile comprising:
a shock absorbing structure which includes:
   a beam structural member having
   (i) a first flange extending in a longitudinal direction,
   (ii) a first web extending from said first flange in a first direction perpendicular to a first surface of said first flange and extending along the longitudinal direction of said first flange, and
   (iii) a second flange extending outwardly from an end portion of said first web in a direction parallel to the first surface of said first flange and extending along the longitudinal direction of said first flange;
   a shock absorbing member having one end abutting the first surface of said first flange and a first side portion adjacent to the one end and fixed to said first web,
wherein said shock absorbing member extends in the perpendicular direction to the first surface, and said second flange extends outwardly from a middle portion of said shock absorbing member in a longitudinal direction of said shock absorbing member.

14. The automobile of claim 6, wherein a concave section is formed from said first web and the first surface of said first flange, and said shock absorbing member fixed to the concave section.

15. The automobile of claim 6, wherein said beam-like structural member further comprises:
a second web extending from said first flange in parallel to said first web in the first direction perpendicular to the first surface of said first flange and extending along the longitudinal direction of said first flange; and a third flange extending outwardly from an end portion of said second web in the direction parallel to the first surface of said first flange and opposed to said second flange and extending along the longitudinal direction of said first flange, wherein said third flange extends outwardly from a middle portion of said shock absorbing member in a longitudinal direction of said shock absorbing member.

16. The automobile of claim 6, wherein a through-hole is provided in a portion of said first flange to which said shock absorbing member abuts.

17. The automobile of claim 6, wherein the one end of the shock absorbing member which abuts the first surface of the first flange is a first distal end of the shock absorbing member, and the shock absorbing member has a second distal end spaced apart from the first distal end in the first direction, wherein the shock absorbing member extends in the first direction from the first surface of the first flange past a distal end of the beam structural member, and wherein said first flange and said second flange of said beam structural member are closer to the first distal end of the shock absorbing member than the second distal end.

18. The automobile of claim 6,
wherein said beam structural member further comprises:
a second web extending from said first flange in parallel to said first web in the first direction perpendicular to the first surface of said first flange and extending along the longitudinal direction of said first flange;

a third flange extending outwardly from an end portion of said second web in the direction parallel to the first surface of said first flange and opposed to said second flange and extending along the longitudinal direction of said first flange, wherein said third flange extends outwardly from a middle portion of said shock absorbing member in a longitudinal direction of said shock absorbing member, wherein the one end of the shock absorbing member which abuts the first surface of the first flange is a first distal end of the shock absorbing member, and the shock absorbing member has a second distal end spaced apart from the first distal end in the first direction, wherein the shock absorbing member extends in the first direction from the first surface of the first flange past a distal end of the beam structural member, and wherein said first flange, said second flange, and said third flange of said beam structural member are closer to the first distal end of the shock absorbing member than the second distal end.

* * * * *